Figure 1:
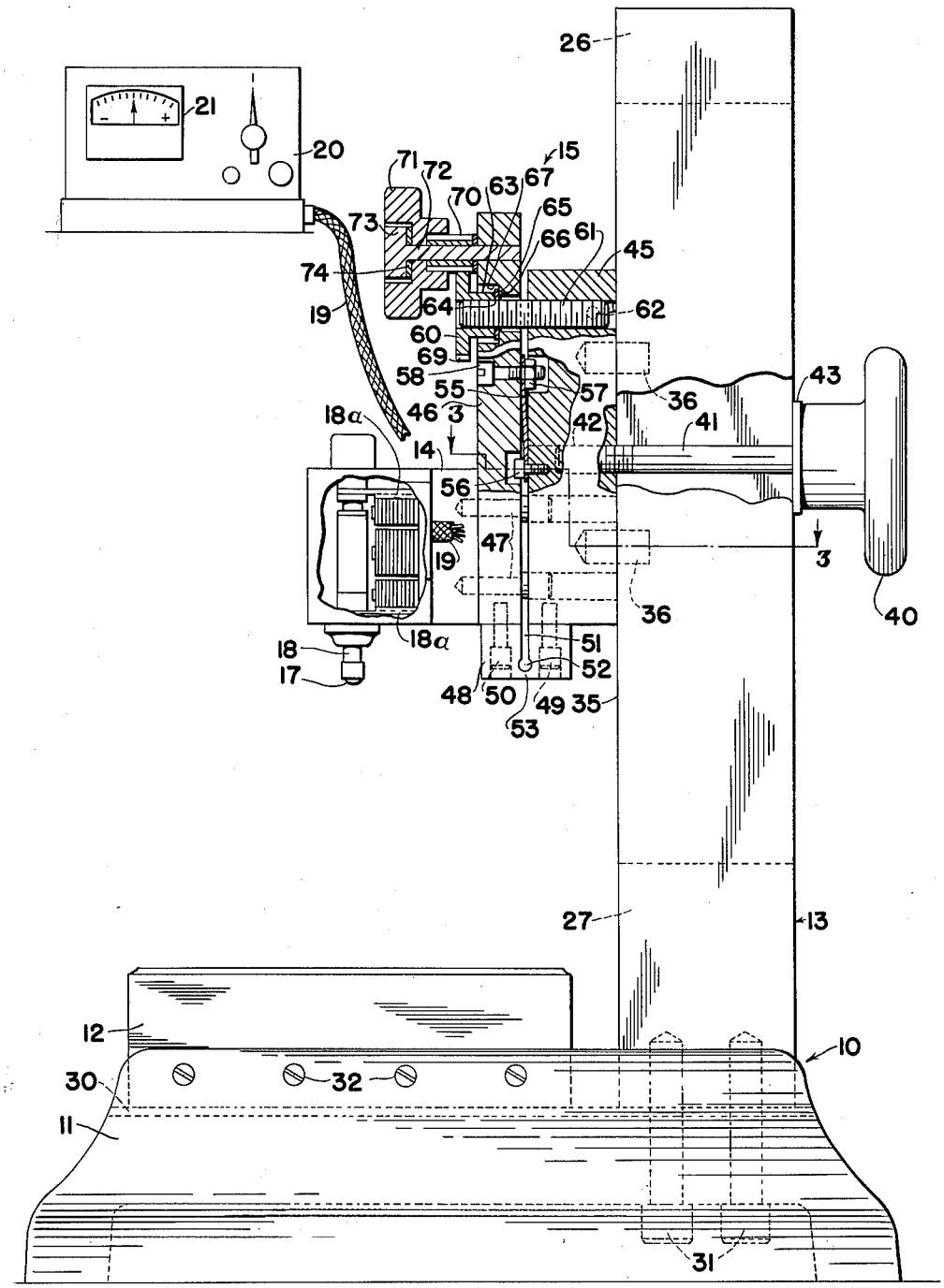

INVENTORS
ERWIN W. GRAHAM
KENNETH C. SCHEDLER
BY
Bosworth & Sessions
ATTORNEYS

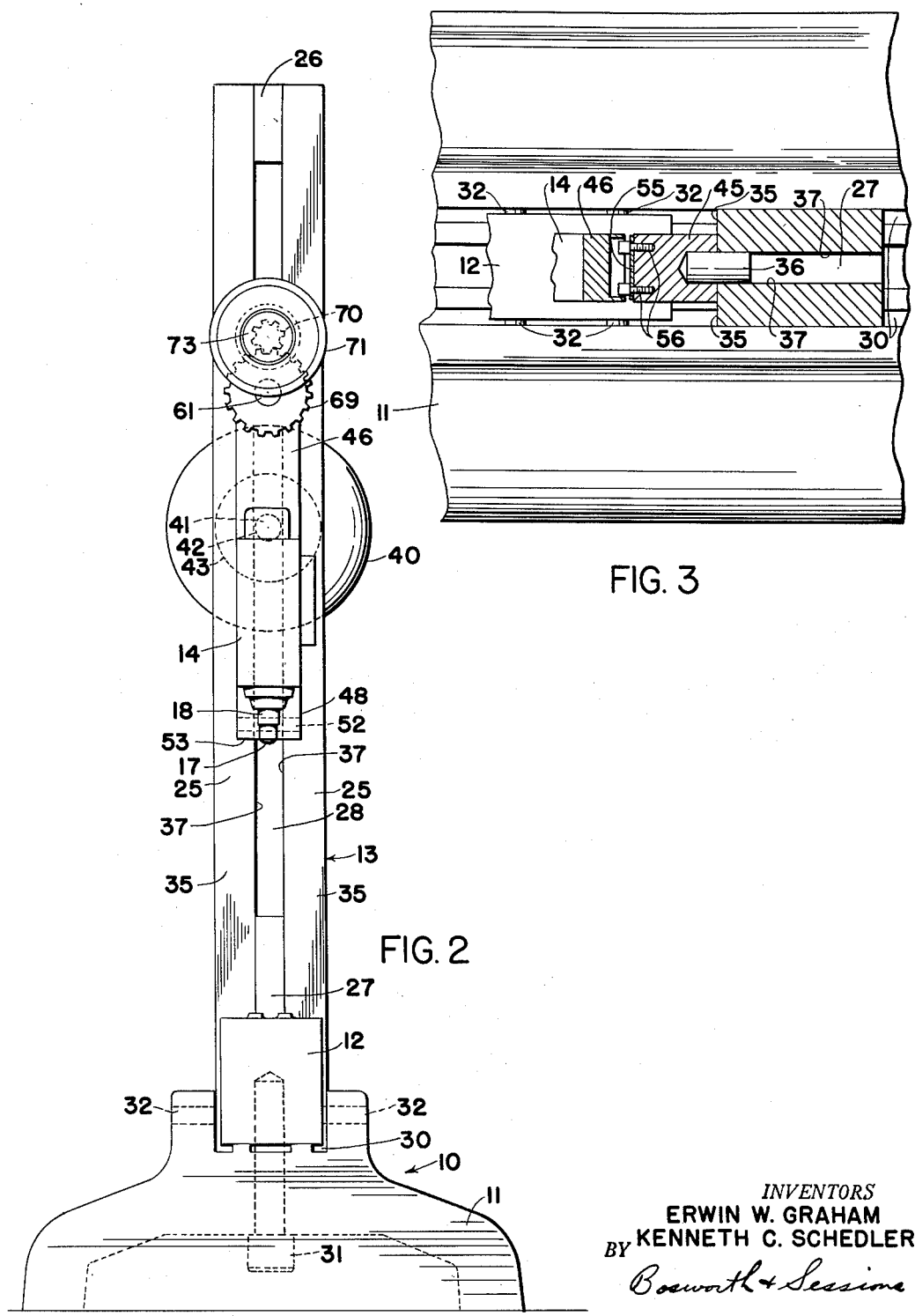

United States Patent Office 2,737,723
Patented Mar. 13, 1956

2,737,723

COMPARATOR HAVING PIVOTAL FINE ADJUSTMENT MEANS

Erwin W. Graham, Parma Heights, and Kenneth C. Schedler, Cleveland, Ohio, assignors to Cleveland Instrument Company, a corporation of Ohio Application May 23, 1952, Serial No. 289,626

9 Claims. (Cl. 33—147)

This invention relates to comparators and more particularly to a stand or mounting whereby the instrument can be readily adjusted and maintained in a precise position of adjustment. The invention is described herein, by way of example, in conjunction with an electronic comparator, but it is to be understood that the invention is readily adaptable to measuring instruments of other types and constructions.

Electronic comparators ordinarily comprise a gage head embodying a sensitive pickup and a gaging tip or point adapted to engage work to be measured; the output of the pickup is amplified and supplied to a meter; deflections of the gaging tip or point with respect to the gaging head change the output of the pickup and result in readings of the meter which correspond to deviations of the workpiece being measured from a predetermined standard. The gage head is mounted upon a rigid stand embodying an anvil on which the work-piece to be measured is supported and means whereby the position of the gage head may be adjusted with respect to the anvil. In using such a comparator, a standard such as a master gage or a gage block of the required dimension is positioned on the anvil; the gage head then is moved to bring the gaging point into contact with the master gage or gage block and the position of the gage head is carefully adjusted to bring the reading of the meter to zero; thereafter a work-piece to be gaged is substituted for the master gage or gage block whereupon the reading of the meter indicates the deviation of the work-piece from the standard dimension.

In such a device the gage head should be mounted so that it may be adjusted quickly to the desired position with a high degree of accuracy and the adjustment must be maintained exactly so that accurate readings can be obtained repeatedly. The high degree of precision required is evident from the fact that in many instances scale readings of 0.00001 inch per division on the meter or full scale readings of plus and minus 0.0002 inch are employed, while some highly accurate microcomparators embody scale readings of 0.000001 inch per division. To make a setting within one one-hundred-thousandth of an inch, or in the extreme case within one one-millionth of an inch, requires a high precision mounting that is easily adjustable in minute amounts, that is free from lost motion or play of any kind and that is rigid and secure and not subject to displacement due to the vibrations and the like ordinarily encountered in the shops and laboratories where such devices are employed.

A general object of the present invention is to provide a comparator embodying the desirable features outlined above. Another object is to provide a comparator stand of simple and relatively economical construction and embodying such features. Another object is the provision of a comparator in which the fine adjustment of the gaging head is accomplished without requiring any sliding surfaces. A further object is the provision of a comparator in which a minimum of fine machining and surface finishing operations are required and yet which can be constructed with a high degree of accuracy.

Further objects and advantages of the invention will become apparent from the following description of a preferred form thereof, reference being made to the accompanying drawings in which Figure 1 is a side elevation of a comparator embodying a preferred form of the invention, parts being broken away for convenience of illustration; Figure 2 is a front elevation of the comparator of Figure 1; and Figure 3 is a section taken as indicated by line 3—3 of Figure 1.

Referring particularly to Figure 1 of the drawings, a comparator embodying the present invention preferably comprises a stand indicated in general at 10 and having a base 11, preferably formed of heavy cast iron, which carries an anvil 12 and which supports an upright column 13, a gage head 14 being adjustably mounted on the column through the fine adjustment mounting block indicated in general at 15. Mounting block 15 in turn is adjustable vertically with respect to column 13 to provide the coarse adjustment of the position of the gage head 14 with respect to a master gage, gage block, work-piece or the like supported on the anvil 12.

The gage head 14 embodies a gaging tip 17 mounted on an elongated support 18 which extends substantially at right angles to the anvil 12 and parallel to column 13 and is axially movable with respect to the gage head. The gaging tip is adapted to engage the work to be measured. The gage head contains a pickup (indicated somewhat diagrammatically in Figure 1) which may be of any suitable construction but preferably is made generally in accordance with the disclosures of the co-pending applications of Erwin W. Graham Serial No. 785,315, filed November 12, 1947, now Patent No. 2,627,062 issued January 27, 1953, and/or Serial No. 212,653, filed February 24, 1951, now Patent No. 2,627,119, issued February 3, 1953. Such a pickup has an armature mounted on the support 18 for the gaging point 17, which armature varies the reluctance of magnetic circuits linking a pair of outer coils with a center coil. The support 18 is mounted for movement in axial directions (vertical in the embodiment shown) on spring members 18a, which are preferably constructed as described and claimed in application Serial No. 785,315 aforesaid, and in such movement remains substantially parallel to itself at all times, so that in the present embodiment a given vertical movement of the gaging tip results in an identical vertical movement of the armature and a corresponding change in the output of the pickup.

The output of the pickup is preferably connected to an amplifying and indicating circuit constructed and arranged in accordance with the disclosure of United States Patent No. 2,508,370 issued on May 23, 1950, on the application of Michael Bozian and assigned to the assignee of the present invention. The precise construction of the gage head and amplifier do not constitute novel elements of the present invention, however, and for the purposes of the present application is suffices to say that the output of the gage head 14 is connected by a cable 19 to amplifier 20 and zero-center meter 21. In use, a master gage, gage block or the like is positioned on the anvil 12 and the gage head is adjusted vertically so that the meter 21 reads zero or as near thereto as possible with the gaging tip 17 in contact with a master gage. When the position of the gage head has been so adjusted the work-piece to be measured is placed on the anvil and the meter 21 indicates the deviation, if any, of the work-piece from the predetermined standard.

In order to provide for a rigid support for the gage head and to permit vertical adjustment of the mounting block, the upright column 13, as shown particularly in Figure 2, is made up of a pair of vertically extending members 25 which are spaced apart by spacing blocks 26 and 27 at the top and bottom, respectively, of the column, leaving a slot 28 between the inner surfaces of the uprights 25. The uprights 25 and the spacers 26 and 27 are preferably composed of steel and while they may be bolted together, it is preferred that they be permanently joined by copper brazing. The assembled column 13 is secured within the recess 30 of the base 10, being firmly held in place by screws 31 extending through suitable openings in the base and into the lower end portion of the column. The anvil 12 is also held in place within the recess 30 by means of screws 32.

As shown particularly in Figures 1 and 3 the mounting block 15 is slidable on the front surfaces 35 of the upright members 25 and is guided by pins 36 which are pressed into the block 15 and fit slidably in the slot 28 between the upright members 25. With this arrangement, the block 15 is guided accurately for movement in vertical directions along the column 13. To insure proper vertical alignment, it is only necessary to mount the column 13 accurately in the base and to finish accurately the contacting surfaces of the block 15 and faces 35 of the members 25, the opposed inner faces 37 of the members 25 and the pins 36. These surfaces can be finished to the required degree of accuracy by grinding or other comparatively simple machining operations. No V grooves or dovetail slots are required, hence the cost of machining can be kept at a reasonable figure.

The mounting block 15 is locked in any desired position of adjustment on the column 13 by means of a hand wheel 40 which is rigidly mounted on a screw 41 which extends through the slot 28 into a threaded opening 42 in the mounting block. A washer 43 preferably is interposed between the base of the hand wheel and the rear surfaces of the uprights 25. The preliminary or coarse adjustment of the position of the gage head 14 can be made rapidly and with a sufficient degree of accuracy simply by supporting the mounting block 15 with one hand and with the other hand slightly loosening the screw 41 by means of the hand wheel 40. The mounting block and gage head assembly are slid down until the gaging point 17 touches the master gage or the like and the the assembly is moved up or down until the meter gives a reading within the limits of its scale. Then the hand wheel 40 is tightened to lock the mounting block in place, thus completing the coarse or preliminary setting of the position of the gage head.

In order to provide for the final, precise adjustment of the gage head 14, the mounting block 15 is made up of two parts which are movable with respect to each other; these are the inner part 45 which contacts the faces 35 of column 13 and receives the clamping screw 41, and the outer part 46 to which the gage head 14 is secured as by screws 47. Inner and outer parts 45 and 46 are disposed substantially parallel to each other and their opposed faces are slightly spaced as shown. The two parts are secured together by a member 48 which, although it has no pivots or the like, functions somewhat in the manner of a hinge and permits limited angular movement of the parts 45 and 46 with respect to each other. Hinge member 48 is rigidly secured to parts 45 and 46 by screws 49 and 50, respectively. While the member 48 is shown as being formed separately from parts 45 and 46, it is evident that member 48 and parts 45 and 46 could all be formed integrally, if desired. It will be noted that hinge member 48 is slotted as at 51, the slot 51 constituting a continuation of the space beween the parts 45 and 46 and preferably terminating in an enlarged opening 52. The slot provides a weakened portion or deformable link 53 in the hinge member 48; the enlarged opening 52 prevents undue concentration of stresses when the hinge member is deflected when the two parts 45 and 46 are adjusted with respect to each other.

The deformable link 53 constitutes in effect, a pivot or axis of rotation lying the parallel to the anvil, about which the outer part 46 may be rotated slightly with respect to the inner par 45. Inasmuch as the link 53 is spaced from the gaging point and lies in or near the horizontal plane of the gaging point 17, i. e., is spaced from the anvil substantially the same distance as the gaging point, such angular movement of the outer part 46 results in raising or lowering of the gage head 14 and the gaging point 17. While the movement of the gaging point 17 during adjustment of the parts is along an arc having a center within or near the deformable link 53, the amount of tilting of the vertical axis of the gaging point and its support 18 is so small within the ordinary range of adjustment of the apparatus which may be plus of minus 0.015 inch, for example, that the accuracy of the instrument is not substantially affected. For example, if the distance from the gaging point 17 to the weakened zone 53 is about two inches, then in making an adjustment of 0.015 inch, which is greater than ordinarily required, the gage head and gaging point will be swung through an arc of about 0.45°. Thus the angle $\alpha$ between the axis of the gage head and the vertical column, resulting from the fine adjustment, will not exceed about 0.45°. The actual distance moved by the gaging point along the axis of the gage head is equal to the vertical distance divided by cosine $\alpha$. The cosine of 0.1° is 0.99997, hence it is evident that the slight rotation of the gage head about the deformable link 53 in making a fine adjustment, can have no substantial effect on measurements made by the instrument.

The mechanism for making the fine adjustment of the position of gage head 14 includes a flat spring 55 interposed between the parts 45 and 46 and secured to part 45 by screws 56 and to part 46 by nut 57 engaging screw 58. The spring 55 tends to urge part 46 away from part 45, i. e., to rotate part 46 in a counterclockwise direction with respect to part 45 as shown in Figure 1.

The rotating force of spring 55 is resisted and part 46 is adjusted and held in desired positions of adjustment with respect to part 45 by means of a nut 60 which is threaded on stud 61, stud 61 being mounted in an appropriate opening in part 45 and secured therein by a pin 62. Nut 60 has a reduced portion 63, the end surface 64 of which bears against a washer 65 which in turn engages shoulder 66 formed at the bottom of a recess 67 in part 46. Rotation of the nut in a right-hand or clockwise direction moves the part 46 toward the part 45 about the weakened zone 53, thus raising the gage head 14 and gaging point 17 while rotation in the opposite direction permits the spring 55 to move the part 46 away from the part 45 thus lowering the gage head 14 and the gaging point 17.

While the nut could be turned directly by the operator making adjustments, according to the preferred form of the invention the outer periphery of the nut is provided with gear teeth 69 so that the nut constitutes a gear. The teeth 69 mesh with the teeth of pinion 70 which is secured to the adjusting knob 71, knob 71 and pinion 70 both being mounted for rotation on a pin 72 which is pressed into a suitable opening in part 46. Knob 71 is held in place by an enlarged head 73 on pin 72. The head 73 fits within a recess in knob 71 and a washer 74 is interposed between the base of the recess and the inner face of the head 73. The gearing reverses rotation of the parts so that when the knob 71 is turned to the right, the gaging point moves downwardly, this being the natural way to make the adjustment. Preferably, the ratio between the pinion and the nut 60 is about one to four. This reduction, coupled with the further reductions brought about by the nut and screw and by the fact that the distance between the screw 61 and the deformable link 53 is approximately twice the distance between gaging point 17 and the link 53, gives a large reduction between movements of the knob and resulting movements of the gaging point and makes possible quick and precise final adjustments of the position of the gage head and gaging point.

It will be noted that the final adjustments are made by means of knob 71 after the mounting block as a whole has been secured solidly to the column 13 by means of knob 40. Inasmuch as the pivotal movement of the part 46 with respect to the part 45 is about the deformable link 53, no sliding parts are required and no lost motion or play is possible in the connection between the two parts. The spring 55 constantly urges the part 46 away from the part 45 and holds the shoulder 66 in engagement with the washer 65 and the washer 65 in engagement with the end surface 64 of the nut 60. The nut is at all times urged in the direction away from the part 45 on the screw 61, thus there can never be any play or lost motion in these adjusting parts. Accordingly, adjustments can be made with a minimum of difficulty and once made the adjustments remain fixed.

The quick and precise adjustment of the gage head 14 and gaging tip 17 is obtained by means of structures that require a minimum of accurate machine work. As described above, the column is preferably built up of two upright members and two spacers welded together and requires a minimum of accurate machining. The fine adjustment does not involve any sliding surfaces or any parts that must fit together with high degrees of accuracy. Accordingly, the parts can be manufactured at reasonable cost and in the completed apparatus there are no parts that contribute to the accuracy of the adjustment that are subject to substantial wear in use.

Those skilled in the art will appreciate that various changes and modifications can be made in the preferred form of the invention described herein without departing from the spirit and scope thereof.

We claim:

1. In a comparator or the like, a stand comprising a base adapted to carry an anvil and support a column extending upwardly from the base, a two-part mounting block having an inner part and an outer part, said inner part being adjustably supported on said column, means for clamping said inner part of said mounting block to said column, a gage head carried by the outer part of said mounting block, said gage head embodying an elongated support, a gaging tip mounted on said support, the axis of said support being substantially perpendicular to said base and said support being axially movable with respect to the gage head, a single integral connection between said mounting block parts constituting a deformable link connecting the two parts of said mounting block together for angular movement with respect to each other about an axis of rotation substantially parallel to said base, said axis of rotation being spaced from said gaging tip and being spaced substantially the same distance from said base as said gaging tip, whereby angular movement of said outer part with respect to said inner part results in movement of said gaging tip toward or away from said anvil substantially along an arc having said axis as a center, and means spaced from said axis for angularly adjusting said outer part with respect to said inner part.

2. In a comparator or the like, a stand comprising a column, a column supporting base, a two-part mounting block having an inner part and an outer part, said inner part being supported on said column, a gage head carried by the outer part of said mounting block, said gage head embodying a gaging tip, a single integral connection between said mounting block parts constituting a deformable link connecting the two parts of said mounting block together for angular movement with respect to each other about an axis of rotation substantailly parallel to said base, said axis of rotation being horizontally spaced from said gaging tip whereby angular movement of said outer part with respect to said inner part results in movement of said gaging tip substantially along an arc in a vertical plane having said axis of rotation as a center, a spring acting between said inner and outer parts and tending to rotate said outer part with respect to said inner part, and a threaded member spaced from said axis of rotation for resisting the action of said spring and for adjusting the position of said inner and outer parts with respect to each other.

3. In a comparator or the like, a stand comprising a column, a two-part mounting block having an inner part and an outer part, said inner part being supported on said column, a gage head carried by the outer part of said mounting block, said gage head embodying a gaging tip, a single connection between said parts constituting a deformable link connecting the two parts of said mounting block together for angular movement with respect to each other about an axis of rotation, said axis of rotation being laterally spaced from said gaging point whereby angular movement of said outer part with respect to said inner part results in movement of said gaging tip substantially along an arc having said axis of rotation as a center, a threaded member extending through the body of one of said parts to engage the body of the other of said parts and spaced from said axis of rotation for adjusting the position of said inner and outer parts with respect to each other, and an adjustable connection between said inner part and said column to locate said inner part in adjusted positions with respect thereto.

4. An adjustable gaging device comprising a two-part mounting block having an inner part and an outer part, said inner part being adapted for support on a column or the like, a gage head carried by the outer part of said mounting block, said gage head embodying a gaging tip, a single connection between said parts constituting a deformable link connecting the two parts of said mounting block together for angular movement with respect to each other about an axis of rotation laterally spaced from said gaging tip whereby angular movement of said outer part with respect to said inner part results in movement of said gaging tip substantially along an arc having said axis of rotation as center, and threaded member extending from one of said parts to the other and carried by one of said parts and engaging the other of said parts and spaced from said axis of rotation for adjusting the position of said inner and outer parts with respect to each other.

5. An adjustable gaging device comprising a two-part frame with said parts connected by a deformable link so arranged that said link acts as a pivot for said parts with respect to each other, one part of said frame being adapted to be secured to a stand, the second part of said frame having a face extending from said pivot along a portion of and substantially parallel to a complementary face on said first part such that the two parts may pivot with respect to each other about an axis at said deformable link, a threaded member on an axis transverse to the planes of and in contact with said complementary faces, said threaded member carried by one of said parts and engaging the other of said parts to pivot said parts relative to each other about said link axis, and a measuring device including a work contacting tip carried by said second part.

6. A gaging device as set out in claim 5 including resilient means connecting said tip and said second part of said frame shiftably to mount said tip with respect thereto.

7. A gaging device as set out in claim 5 including resilient means between said two parts acting to move them with respect to each other about said pivot.

8. An adjustable gaging device comprising a two-part frame with said parts connected by a deformable link so arranged that said link acts as a pivot for said parts with respect to each other, one part of said frame being adapted to be secured to a stand, the second part of said frame having a face extending from said pivot along a portion of and substantially parallel to a complementary face on said first part such that the two parts may pivot with respect to each other about an axis at said deformable link, a threaded member on an axis substantially normal to and intersecting the planes of said complementary faces and carried by one of said parts threadedly to engage the other of said parts to pivot said parts relative to each other about said link axis, and a measuring device carried by said second part including a work contacting tip shiftably mounted for movement with respect to said second part in a path substantially parallel to said faces.

9. An adjustable gaging device comprising a two-part frame, each part being of a solid rectangular block construction and said parts being connected by a deformable link at their lower ends so that said link acts as a pivot for said parts with respect to each other, one part of said frame being adapted to be secured to a stand, a second part of said frame having a face extending from said pivot along a portion of and substantially parallel to a complementary face on said first part such that the two parts may pivot with respect to each other about the horizontal axis of said deformable link, a threaded member on an axis substantially normal to and intersecting the planes of said complementary faces and carried by one of said parts threadedly to engage the other of said parts to pivot said parts relative to each other about said horizontal axis, and a measuring device carried by said second part including a work contacting tip shiftably mounted for movement with respect to said second part in a path substantially parallel to said faces, the said axis of said link being in the same horizontal plane and laterally spaced from said contacting tip, said link being non-deformable other than about said pivotal horizontal axis.

References Cited in the file of this patent

UNITED STATES PATENTS

| | | |
|---|---|---|
| 328,861 | Richards | Oct. 20, 1885 |
| 2,096,956 | Brown | Oct. 26, 1937 |
| 2,219,037 | Street | Oct. 22, 1940 |
| 2,307,831 | Emery | Jan. 12, 1943 |
| 2,372,879 | Bjorklund et al. | Apr. 3, 1945 |
| 2,516,053 | Farkas | July 18, 1950 |
| 2,581,264 | Levesque | Jan. 1, 1952 |
| 2,583,791 | Neff | Jan. 29, 1952 |

FOREIGN PATENTS

| | | |
|---|---|---|
| 125,905 | Sweden | Aug. 30, 1949 |